Nov. 24, 1936.  F. H. HARTMAN  2,062,175
METHOD OF MANUFACTURING INLAID WOOD ARTICLES
Filed Dec. 10, 1935
Fig. 2.  Fig. 1.  Fig. 3.
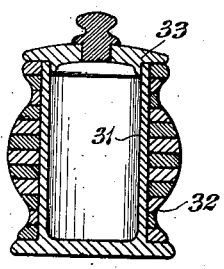
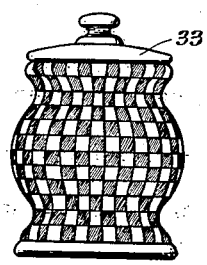
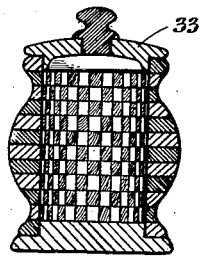
Fig. 4.  Fig. 6.  Fig. 8.  Fig. 10.
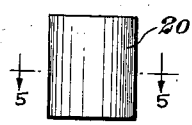
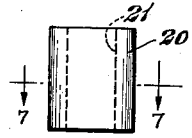
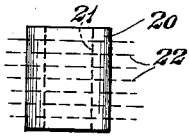
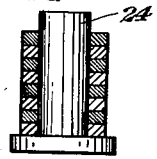
Fig. 5.  Fig. 7.  Fig. 9.  Fig. 11.
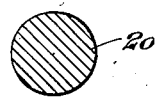
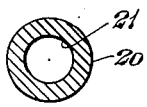
Fig. 12.  Fig. 13.  Fig. 14.  Fig. 15.
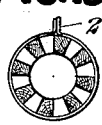
Fig. 16.
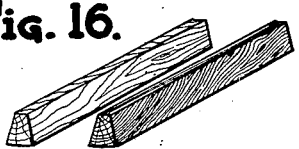
Fig. 18.
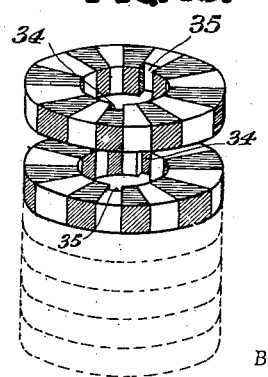
Fig. 17.
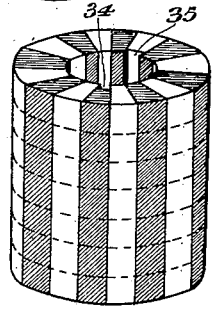
INVENTOR.
Frank H. Hartman
BY Thomas S. Ross
ATTORNEY.

Patented Nov. 24, 1936

2,062,175

UNITED STATES PATENT OFFICE 2,062,175

METHOD OF MANUFACTURING INLAID WOOD ARTICLES

Frank H. Hartman, Norwood, Ohio

Application December 10, 1935, Serial No. 53,765

3 Claims. (Cl. 144—309)

My invention relates to the method employed in constructing hollow wood articles with an inlaid surface, and more particularly to cylindrical articles having an irregular surface.

The object of my invention resides in the novel method employed to construct a hollow container with an irregular surface of inlaid appearance. A further object is to provide for manufacturing the same cheaply, for increasing its durability and enhancing its appearance.

My invention will be further readily understood from the following description and claims, and from the drawing, in which latter:

Fig. 1 is a side elevation of the finished product.

Fig. 2 is a vertical cross-section of the same.

Fig. 3 is a vertical cross-section of a modified form.

Fig. 4 is a side elevation of a cylinder of wood.

Fig. 5 is a section of the same, taken on the line 5—5 of Fig. 4.

Fig. 6 is a view similar to Fig. 4, with the center bored out.

Fig. 7 is a section of the same, taken on the line 7—7 of Fig. 6.

Fig. 8 is a view similar to Fig. 6, showing the manner in which the block is cut.

Fig. 9 is a perspective view of one of the cut pieces.

Fig. 10 shows the cut pieces assembled on a fixture, with the pieces in section.

Fig. 11 is a plan view of the same, showing the vertical cuts.

Fig. 12 shows the alternate strips arranged on a piece of flexible material.

Fig. 13 shows the strips drawn into a cylinder.

Fig. 14 shows the assembled strips secured to a base.

Fig. 15 is a view similar to Fig. 14, showing the next operation in dotted lines.

Fig. 16 shows a pair of strips of different colors in a modified form of producing the invention.

Fig. 17 shows the strips assembled, and;

Fig. 18 shows the assembled strips cut horizontally.

My improved method for producing a hollow turned article with an inlaid surface, comprises the selection of cylinders of wood 20, one of light colored wood and another of dark colored wood turned and cut off to the proper size. The cylinders are bored out as at 21, and cut horizontally along the lines 22 to form collars 23. The collars are then assembled on a fixture 24, alternating a light and a dark collar, with a suitable glue applied to the faces 25 to secure the collars together and form a cylinder with rings of alternating colors. The cylinder is removed from the fixture and cut vertically into segments along the lines 26. The segments are placed on a flexible strip 27 with the colors staggered, glue is applied to the surfaces 28 and the strips drawn into a cylinder as indicated in Fig. 13, to again form a cylinder of the pieces with alternate squares of light and dark wood. After the glue has set the strip 27 is removed.

A base 29 is glued to the assembled cylinder and may extend through the cylinder as at 30 or may be attached to the lower portion as indicated in Fig. 3. If the base extends through the cylinder, it is bored out as at 31 to form a container with the inner face having a smooth plain surface. The outer surface of the cylinder is turned to the desired shape to produce an artistic appearance to the article as indicated at 32. A suitable cover 33 is provided with a knob of opposite color to the cover.

In Figs. 16 to 18 inclusive, I have shown a modified form of my method in which the blocks 20 are cut vertically into segments after having been bored out. The segments are then assembled with alternate light and dark pieces into a cylinder, with keyways 34 and 35 cut therein. One keyway is in a dark segment and the other in a light segment. The assembled cylinder is cut horizontally to form collars after which they are assembled with alternate light and dark pieces above each other on a base provided with a key, that is, one collar is placed thereon with the key in a dark segment and the next one is placed thereon with the key in a light segment to form a cylinder with alternate blocks, thus producing the same result as in the preferred form.

It will be apparent from the foregoing description, that I have conceived a method for forming inlaid articles which is simple, easy to perform and produces an article of beauty.

Having thus fully described my invention, what I claim as new and desire to secure by Letters Patent, is:

1. The method of manufacturing inlaid articles consisting of the selection of cylinders of light and dark wood, boring out said cylinders, cutting said cylinders horizontally into collars, securing alternate light and dark collars together, cutting said assembled collars into segments, alternating said segments and securing them together to form a cylinder, inserting a base in said cylinder and turning the periphery of the cylinder to the desired shape.

2. The method of manufacturing inlaid articles consisting of the selection of cylinders of light and dark wood, boring out said cylinders, cutting said cylinders vertically into segments, assembling said segments alternately, cutting said assembled cylinder transversely of said first cut, assembling said cut pieces alternately to form squares of opposite colors, inserting a base in said assembly and turning the periphery of said cylinder to the desired shape.

3. The method of manufacturing inlaid articles which consists in selecting wedge shaped segments of light and dark wood, assembling said light and dark segments alternately into cylinder formation, cutting a longitudinal keyway in one light and one dark segment in said assembled cylinder, cutting said assembled cylinder transversely of said first cut into collars, assembling said collars one upon another so that the keyway in the dark blocks is in alignment with the keyway in the light blocks to form squares of opposite colors, securing said assembled collars together and finally turning the periphery of said assembled cylinder of block formation to the desired shape.

FRANK H. HARTMAN.